(12) United States Patent
Uchiyama

(10) Patent No.: US 7,884,867 B2
(45) Date of Patent: Feb. 8, 2011

(54) LENS APPARATUS AND IMAGE-PICKUP APPARATUS

(75) Inventor: Minoru Uchiyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1283 days.

(21) Appl. No.: 11/446,796

(22) Filed: Jun. 5, 2006

(65) Prior Publication Data
US 2006/0280482 A1 Dec. 14, 2006

(30) Foreign Application Priority Data
Jun. 6, 2005 (JP) ............................. 2005-165429

(51) Int. Cl.
*G03B 7/00* (2006.01)
(52) U.S. Cl. ...................... 348/296; 348/362
(58) Field of Classification Search ............... 348/296, 348/297, 362, 363, 364, 366, 367
See application file for complete search history.

(56) References Cited

U.S. PATENT DOCUMENTS

2003/0147001 A1* 8/2003 Kikuchi et al. ............... 348/363

FOREIGN PATENT DOCUMENTS

| JP | 01-177776 A | 7/1989 |
| JP | H01-177776 | 7/1989 |
| JP | 2000-098449 A | 4/2000 |
| JP | 2003-174584 | 6/2003 |

* cited by examiner

*Primary Examiner*—David E Harvey
(74) *Attorney, Agent, or Firm*—Rossi, Kimms & McDowell LLP

(57) ABSTRACT

A lens apparatus is disclosed which is capable of picking (taking) moving images and picking still images by using a mechanical shutter without a detector to detect the state of the mechanical shutter. The lens apparatus comprises an aperture stop, a mechanical shutter, and a lens controller which sends first information used for an electronic shutter control of the image-pickup element to an image-pickup apparatus. The first information relates to time or speed, determined according to an opening state of the aperture stop, from the start of image-pickup with the image-pickup element to the completion of closing operation of the mechanical shutter.

4 Claims, 7 Drawing Sheets

LENS APPARATUS AND IMAGE-PICKUP APPARATUS

BACKGROUND OF THE INVENTION

The present invention relates to an image-pickup apparatus for picking (taking) still images using a mechanical shutter and an electronic shutter image-pickup capable of taking moving images.

Many image-pickup apparatuses for taking moving images such as video cameras are capable of taking still images with high resolution. In such image-pickup apparatuses, an image-pickup apparatus has been proposed in Japanese Patent Laid-Open No. 2003-174584, which is capable of performing progressive still image-pickup that has no temporal lag by using combination of a mechanical aperture stop and an electronic aperture stop, even in a case where a CCD sensor that performs only interlace image-pickup is employed.

On the other hand, in image-pickup apparatuses for taking still images, which employ a mechanical shutter, an art is proposed, which controls drive of the shutter so that the shutter is driven to a full-closed state in a predetermined time using a detector to detect the full-closed state of the shutter such as an optical sensor and a hall element.

However, there is some cases where the detector to detect the full-closed state of the mechanical shutter cannot be provided due to increase of speed of the mechanical shutter, insufficient space in the apparatus, and requirement of cost reduction. In this case, there is a problem that taking still images using the mechanical shutter cannot be controlled.

BRIEF SUMMARY OF THE INVENTION

One object of the present invention is to provide a lens apparatus and an image-pickup apparatus capable of taking moving images and taking still images by using a mechanical shutter without a detector to detect the state of the mechanical shutter.

According to an aspect, the present invention provides a lens apparatus which is detachably attached to an image-pickup apparatus including an image-pickup element. The lens apparatus comprises an aperture stop, a mechanical shutter, and a lens controller which sends first information used for an electronic shutter control of the image-pickup element to the image-pickup apparatus. The first information is information relating to one of time and speed from the start of image-pickup with the image-pickup element to the completion of closing operation of the mechanical shutter, according to an opening state of the aperture stop.

According to another aspect, the present invention provides an image-pickup apparatus to which the above-described lens apparatus is detachably attached. The image-pickup apparatus comprises an image-pickup element, and an image-pickup controller that performs an electronic shutter control of the image-pickup element based on the first information from the lens apparatus.

According to another aspect, the present invention provides an image-pickup system including the above-described lens apparatus and image-pickup apparatus.

According to still another aspect, the present invention provides an image-pickup apparatus which comprises an image-pickup element, an aperture stop, a mechanical shutter, and a controller which performs an electronic shutter control of the image-pickup element based on first information. The first information is information relating to one of time and speed from the start of image-pickup with the image-pickup element to the completion of closing operation of the mechanical shutter according to an opening state of the aperture stop.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
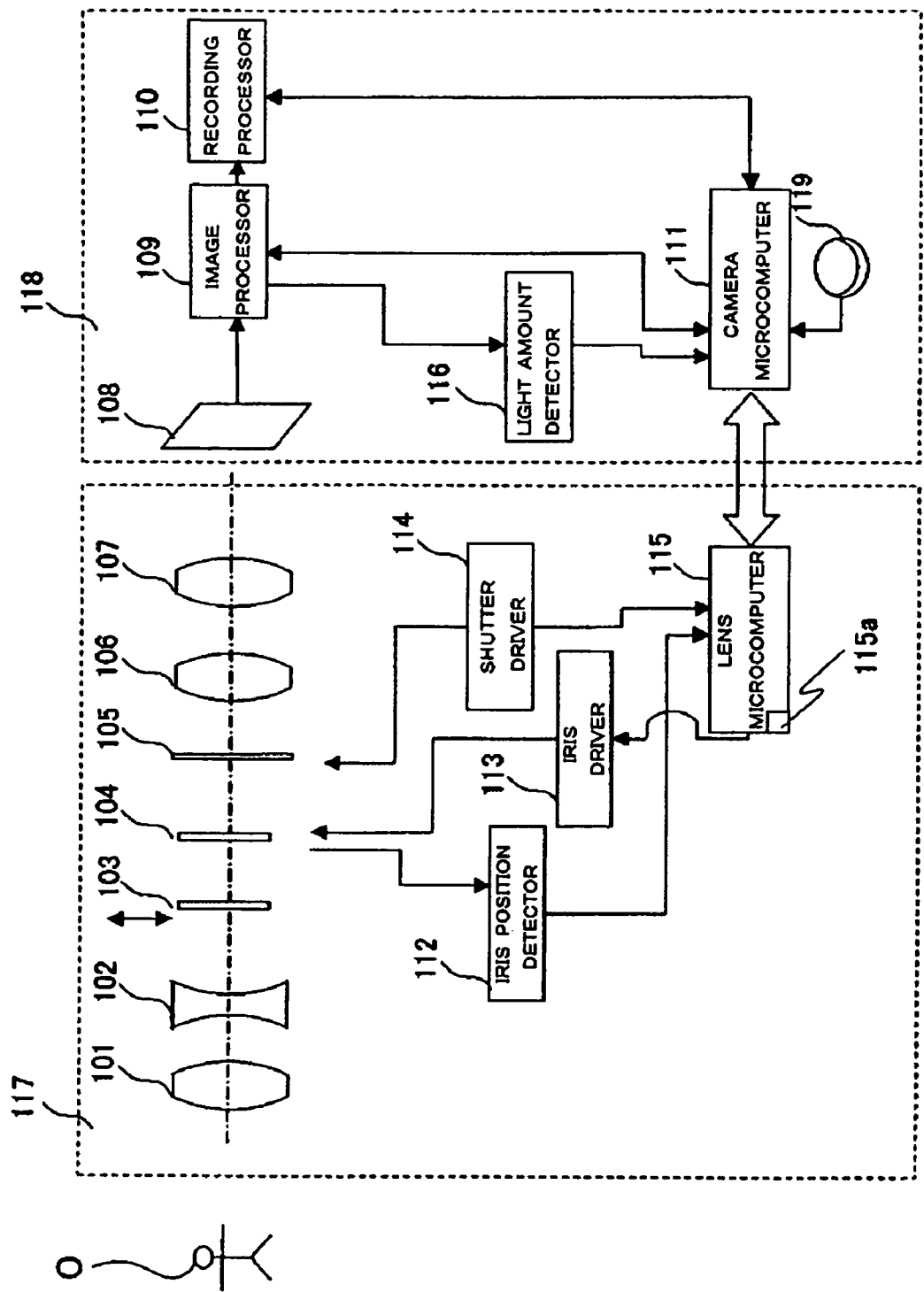
FIG. 1 is a block diagram showing the configuration of the image-pickup system that is Embodiment 1 of the present invention.

FIG. 1 shows the configuration of the lens-interchangeable image-pickup system that is Embodiment 1 of the present invention. The image-pickup system is constituted by a lens apparatus 117 and a camera (image-pickup apparatus) 118 to which the lens apparatus 117 is detachably attached.

Light that entered the lens apparatus 117 from an object O passes through an image-taking optical system and enters the camera 118. The image-taking optical system is constituted by, in order from the object side, a fixed lens unit 101, a zoom lens unit (variator) 102 for varying the magnification, an aperture stop (hereinafter, referred to as an iris) 104, a mechanical shutter 105, a fixed third lens unit 106, and a focus lens unit (compensator) 107 for focusing.

An ND filter 103 can be inserted into and removed from an area between the zoom lens unit 102 and the iris 104, which enables two-step light amount adjustment. The iris 104 is a mechanical aperture stop, adjusting the light amount stepwise or continuously. The mechanical shutter 105 is provided separately from the iris 104; its shutter operation from the full-open state to the full-closed state enables taking still images.

The light that entered the camera 118 from the image-taking optical system reaches an image-pickup element 108 such as an interlace CCD sensor and a CMOS sensor. The image-pickup element 108 electrically converts an object image formed on its light-receiving surface into an electronic signal.

The output signal from the image-pickup element 108 is subjected to processes such as AGC (auto gain control) and color adjustment by an image processor 109, and then sent to a recording processor 110. The recording processor 110 records the processed signal as an image signal on a recording medium such as a semiconductor memory, an optical disk, or a magnetic tape, not shown. The image (moving image) taken at this time is an image having 60 fields per one second in NTSC format, or an image having 50 fields per one second in PAL format.

A light amount detector 116 measures whether the current image signal has an adequate light amount or not on the basis of the image signal output from the image processor 109, and then sends a light amount evaluation value signal (data) showing an evaluation value of the amount of light incident on the image-pickup element 108 to a camera microcomputer 111.

The camera microcomputer 111 communicates the data to a lens microcomputer 115 via an electric contact. The communication cycle is a cycle of once per 60 seconds in NTSC format, or a cycle of once per 50 seconds in PAL format. Specifically, the data exchange is performed between the lens apparatus 117 and the camera 118 through serial communications that triggered by a communication-starting signal.

The data includes data required for camera control and lens control such as camera setting information, lens setting information, AF (auto focus) information, iris information, and shutter information.

The lens microcomputer 115 controls the iris 104 based on data from the light amount detector 116. The iris 104 is equipped with an iris position detector 113 which detects the position of aperture blades corresponding to the opening state (aperture diameter). The current iris position, that is, aperture value (F-number) thereby can be electrically detected.

In addition, an iris driver 113 is provided which changes the iris position. The lens microcomputer 115 calculates the driving amount of the aperture blades based on the light amount evaluation value from the light amount detector 116 to obtain an adequate aperture value. The lens microcomputer 115 performs positional servo control of the aperture blades through the iris driver 113 to control the aperture diameter.

The repetition of a series of operations from the light amount detection and evaluation to the drive of the iris 104 enables adequate light amount control.

The mechanical shutter 105 has two stable states that are the full-open state and the full-closed state, being fixed to the full-open state through a shutter driver 114 when taking moving images.

The camera 118 is equipped with a release switch 119 that is operated when taking a still image. A half-press operation (S1 ON) of the release switch 119 starts a still-image-pickup preparing operation. The still-image-pickup preparing operation includes a focusing operation to focus the image-taking optical system on the object and an iris driving operation to obtain an adequate exposure.

In normal still image-pickup, the exposure is automatically determined according to the AGC, the aperture value, and the shutter speed. In addition, the user can select image-pickup modes such as a shutter-speed priority mode and an aperture-priority mode.

A full-press operation (S2 ON) of the release switch 119 causes the camera 118 to take a still image by mechanical shutter control and electronic shutter control. The description of the still-image-pickup operation in the case where the interlace CCD sensor is employed will hereinafter be made with reference to FIG. 2.

Figure 2:
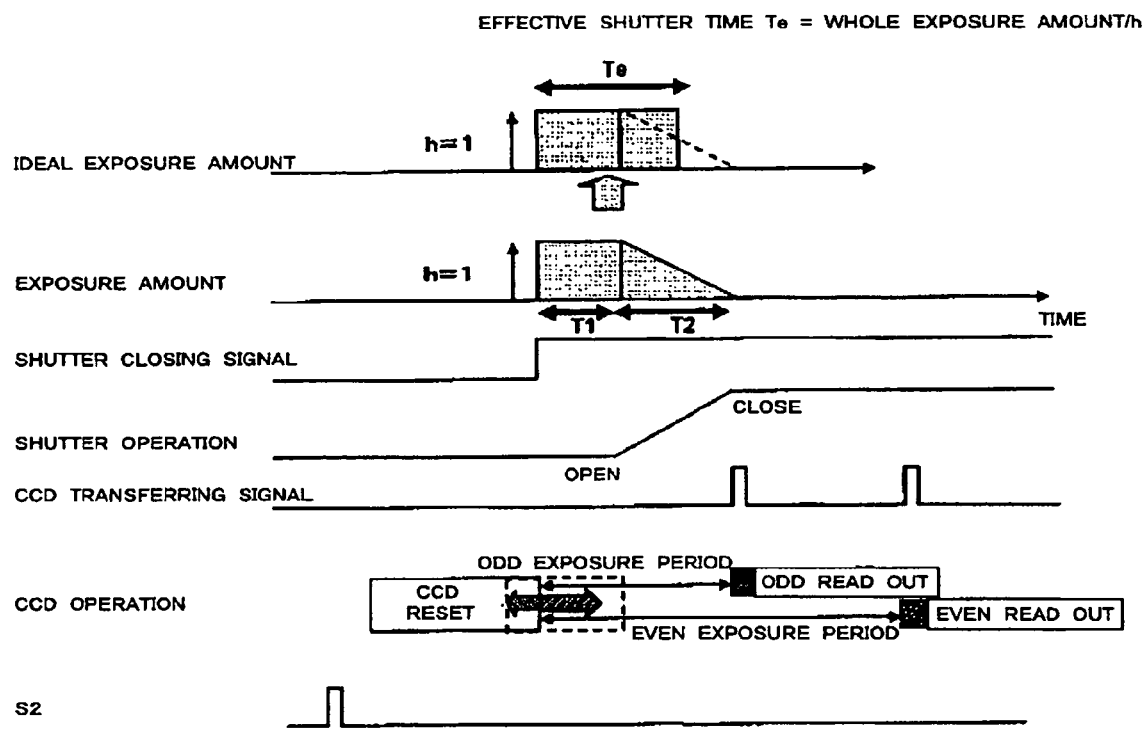
FIG. 2 is a timing chart showing the operation of the image-pickup system of Embodiment 1.

FIG. 2 shows, in order from the bottom, the output timing of a release signal S2 associated with the full-press operation of the release switch 119, the timing of the image-pickup element (CCD) operation (electronic shutter control), the output timing of a CCD transferring signal, the position of the mechanical shutter 105, the output timing of a shutter closing signal, the actual exposure amount of the image-pickup element 108, and an ideal exposure amount.

First, the full-press operation (S2 ON) of the release switch 119 starts a CCD resetting operation to reset the charge accumulated in the image-pickup element 108 as one of the electronic shutter control. After the completion of the CCD resetting operation, the charge accumulation (image-pickup) of the image-pickup element 108 is started, and the shutter-closing signal (command signal) is sent from the camera microcomputer 111 to the lens microcomputer 115. At this point, the mechanical shutter 105 is in the full-opened state.

The lens microcomputer 115 counts time with a timer after receiving the shutter-closing signal, and starts a closing operation of the mechanical shutter 105 through the shutter driver 114 when a predetermined time elapsed after the start of the charge accumulation of the image-pickup element 108. The mechanical shutter 105 operates from the full-opened position to the full-closed position in an approximately constant time.

The image-pickup element 108 is subjected to an approximately constant light amount (exposure amount) per unit time until the mechanical shutter 105 starts shielding the light that passed through the aperture of the iris 104. Then, the exposure amount comes close to 0 as the shielding of light that passed through the aperture progresses, and finally becomes 0 (full-closed state).

The "exposure amount" in FIG. 2 shows the change of the exposure amount during the above-mentioned operation. The period T1 shows a time from the start of the charge accumulation of the image-pickup element 108 to the start of the shielding of light that passed through the aperture by the start of the closing operation of the mechanical shutter 105.

The period T2 shows a time from the start of the shielding of light that passed through the aperture by the mechanical shutter 105 to the completion of the closing operation of the mechanical shutter 105 to the full-closed position (that is, the completion of the reduction of the exposure amount to 0). In this period T1, the exposure amount of the image-pickup element 108 is gradually reduced.

The whole exposure amount from the start of the charge accumulation of the image-pickup element 108 to the completion of the closing operation of the mechanical shutter 105 to the full-closed position is the sum of the exposure amount in the period T1, shown by the rectangular area, and the exposure amount in the period T2, shown by the triangular area.

The value obtained by dividing the whole exposure amount by the exposure amount per unit time with the aperture value (aperture diameter) in this image-pickup is the effective shutter time Te. The effective shutter time Te corresponds to a shutter open time in an ideal exposure operation without consideration of a gradual aperture change of the mechanical shutter 105. The inverse of the effective shutter time Te is the effective shutter speed.

After the mechanical shutter 105 is closed in this way, the charge of the odd-numbered vertical pixel (ODD) in the image-pickup element 108 is read out at the timing of the output of the CCD transferring signal, as shown in "CCD operation", and then, after the completion thereof, the charge of the even-numbered vertical pixel (EVEN) is read out at the next timing of the output of the CCD transferring signal.

Since the read-out timings of ODD and EVEN are different from each other, the exposure periods of ODD and EVEN are different from each other originally. However, the mechanical shutter 105 closes immediately before the read-out timing of ODD, so that the actual exposure amounts of ODD and EVEN become the same amount.

The mechanical shutter 105 always operates from the full-opened position to the full-closed position in a constant time by using a constant current circuit or the like. However, the shutter speed is always constant if nothing is done. Therefore, to allow changes of the shutter speed, the CCD reset timing of the electronic shutter is changed in this embodiment. It thereby is possible to change the shutter speed and the shutter time arbitrarily. To this end, it is important to know the above-described effective shutter time and effective shutter speed.

Figure 3A:
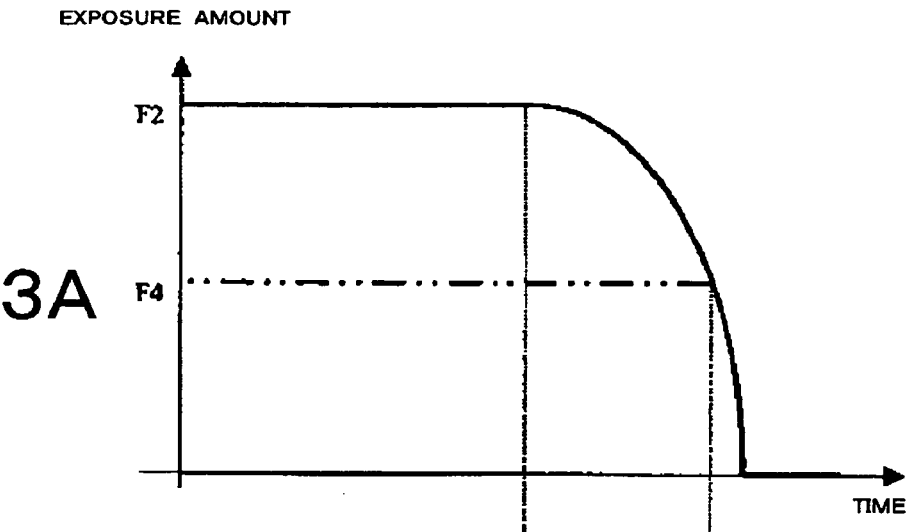
FIGS. 3A, 3B, and 3C are graphs showing the shutter operation, exposure period, and effective shutter time for each F-number, respectively, in Embodiment 1.

FIG. 3A shows the change of the exposure amount in cases where the aperture values (F-numbers) are F2 and F4, the mechanical shutter 105 starting at the same time in the two cases. The vertical axis represents the exposure amount, and the horizontal axis represents time.

In this embodiment, the iris 104 and the mechanical shutter 105 are different constituents, and the mechanical shutter 105 is driven with a constant current, so that the operation time of the mechanical shutter 105 from the full-opened position to the full-closed position does not change according to the F-number. However, the exposure amount (h) per unit time changes according to the F-number.

Further, the period (part of T1) from the start of the closing operation of the mechanical shutter 105 to the arrival at the position (hereinafter, referred to as the light-shielding start position) where the mechanical shutter 105 starts the shielding of light that passed through the iris's aperture and the period T2 therefrom to the arrival at the full-closed position change according to the F-number.

Figure 3B:
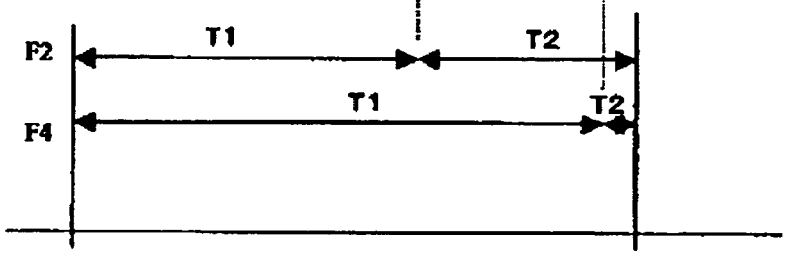
Figure 3C:
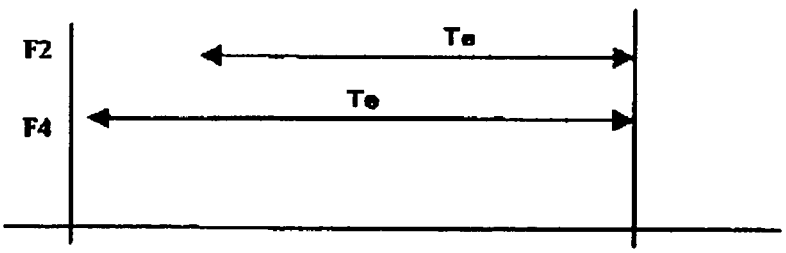

FIG. 3B shows the periods T1 and T2 for F2 and F4. When comparing the case of F2 with the case of F4, the period T1 for F4 is longer than that for F2, and the period T2 for F4 is shorter than that for F2. Since a longer period T1 makes a longer effective shutter time Te, the effective shutter time for F4 is longer than that for F2. In other words, the effective shutter time Te changes according to the F-number, and a larger F-number makes a longer effective shutter time.

Therefore, the effective shutter time Te for each representative F-number is stored in a memory 115a provided in the lens microcomputer 115 in this embodiment. The lens microcomputer 115 reads out the effective shutter time Te according to the detected current F-number (that is, the opening state of the iris 104 detected by the iris position detector 112) from the memory and sends it to the camera microcomputer 111.

The camera microcomputer 111 controls the timing of the CCD reset in the electronic shutter control on the basis of the received effective shutter time Te. Thereby, it is possible to set a desired shutter speed for taking still images.

When the detected F-number is not included in the representative F-numbers stored in the memory 115a, the lens microcomputer 115 obtains the effective shutter time Te corresponding to the detected F-number by an interpolation calculation from the effective shutter times corresponding to the representative F-numbers near the detected F-number, and sends it to the camera microcomputer 111.

The description will hereinafter be made of the way to calculate the CCD reset timing in the electronic shutter control using the effective shutter time Te by the camera microcomputer 111.

For instance, in a case where the F-number is F2, T1=12 ms, T2=2 ms, T1+T2=14 ms, Te=13 ms, and a desired shutter speed (shutter time) is 1/100 sec., 1/100 sec. is equal to 10 ms, so that:

$$Te-(\text{the shutter time})=13-10=+3 \text{ ms}.$$

Therefore, performing the CCD reset operation until 3 ms after the start of the closing operation of the mechanical shutter 105 enables image-pickup at a shutter speed of 1/100 sec.

Alternatively, in a case where a desired shutter speed is 1/60 sec., 1/60 sec. is equal to 16.6 ms, so that:

$$Te-(\text{the shutter time})=13-16.6=-3.6 \text{ ms}.$$

Therefore, performing the CCD reset operation until 3.6 ms before the start of the closing operation of the mechanical shutter 105 enables image-pickup at a shutter speed slower than the shutter speed corresponding to the effective shutter time Te.

In a case where, however, a desired shutter speed is 1/1000 sec., 1/1000 sec. is equal to 1 ms, which is a shutter time shorter that T2 (=2 ms). In other words, it is an unrealizable shutter speed for F2 in the mechanical shutter 105.

Therefore, in this embodiment, the value of T2 for each F-number is set as the maximum value of allowable shutter speeds, and the limit shutter time that is that maximum value or the limit shutter speed that is the inverse thereof is sent from the lens microcomputer 115 to the camera microcomputer 111. The camera microcomputer 111 prohibits selecting a shutter speed faster than the limit shutter speed.

The values of T2 and Te according to each F-number can be obtained by measurement using a generally-used shutter testing machine. These measured data are stored in the memory 115a such as an EEPROM provided in the lens microcomputer 11, which enables preparing the effective shutter time and the limit shutter time (or, the effective shutter speed and the limit shutter speed) for each F-number.

Figure 4:
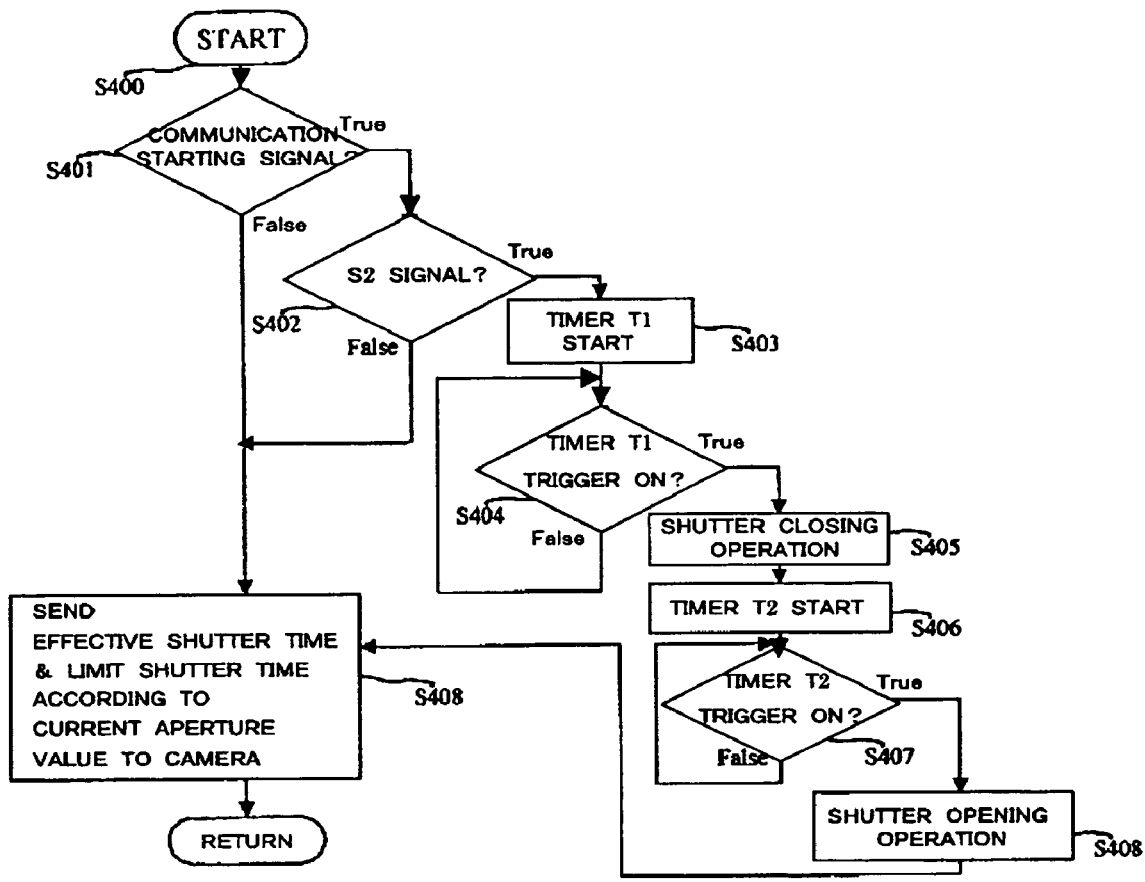
FIG. 4 is a flow chart showing the operation of the lens microcomputer in Embodiment 1.

Next, the description will be made of the still-image-pickup process performed by the lens microcomputer 115 in this embodiment with reference to the flow chart shown in FIG. 4.

After starting from Step (hereinafter, abbreviated as "S") 400, the lens microcomputer 115 judges whether or not it received the communication-starting signal from the camera microcomputer 111 (S401). When the lens microcomputer 115 received the communication-starting signal, the process proceeds to S402.

When the lens microcomputer 115 has not received the communication-starting signal, the lens microcomputer 115, at S408, detects the current aperture value (F-number), reads out information of the effective shutter time (or the effective shutter speed) and the limit shutter time (or the limit shutter speed) for the current F-number from the memory 115a, and sends the information to the camera microcomputer 111. The information is sent to the camera microcomputer 111 at a constant cycle, and the camera microcomputer 111 performs the electronic shutter control using the newest received information.

The lens microcomputer 115, at S402, judges whether or not the S2 signal was included in the previous communication. When not included, the process proceeds to S 408. On the other hand, when the S2 signal was included, the lens microcomputer 115 starts a timer for counting the time T1 (the same time as the period T1) at S403.

When the time T1 elapsed at S404, the lens microcomputer 115 starts the closing operation of the mechanical shutter 105 via the shutter driver 114 at S405. The reason why the lens microcomputer 115 waits for the elapse of the time T1 at S404 before the start of the shutter closing operation is as follows. Individual lens apparatuses have variations in timing of the shutter operation due to manufacturing variations of the lens apparatuses or the mechanical shutters. Therefore, adjustment to match the start timing of the shutter closing operation between the lens apparatuses by using the wait time T1 is necessary.

Next, the lens microcomputer 115 starts a timer for counting the time T2 (the same time as the period T2) at S406. When the time T2 elapsed at S407, the lens microcomputer 115 returns the mechanical shutter 105 via the shutter driver 114 from the full-closed position to the full-opened position at S408. This is the end of the process of still-image-pickup.

Although, in this embodiment, the description was made of the process in the case where a CCD sensor is employed as the image-pickup element 108, a basically similar process to that in the case where the CCD sensor is employed is performed in a case where a CMOS sensor is employed as the image-pickup element 108.

Figure 7:
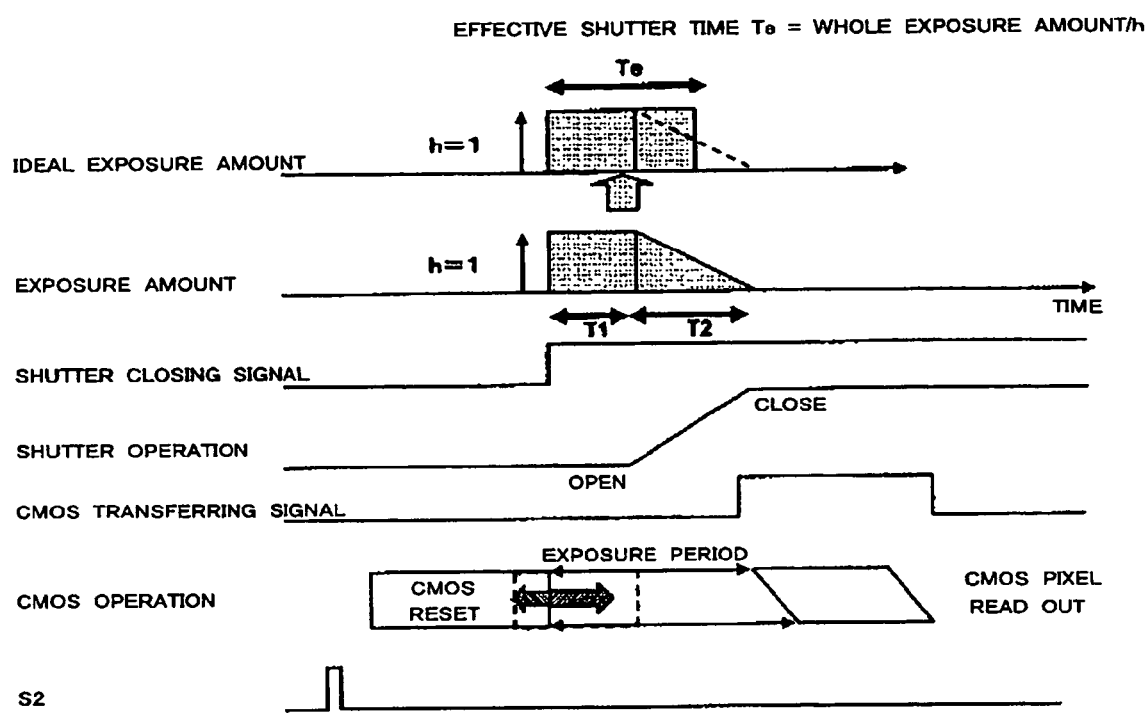
FIG. 7 is a timing chart showing the operation of the image-pickup apparatus in a case where a CMOS sensor is used as an image-pickup element in Embodiment 2.

FIG. 7 shows, in order from the bottom, the output timing of the release signal S2 associated with the full-press operation of the release switch 119, the timing of a CMOS operation (electronic shutter control), the output timing of a CMOS transferring signal, the position of the mechanical shutter 105, the output timing of the shutter closing signal, the actual exposure amount of the image-pickup element (CMOS sensor) 108, and an ideal exposure amount.

For the CMOS sensor, one pixel unit or one line unit is used as a unit of charge readout. Sequential specifying pixels or lines by the CMOS transferring signal enables reading out the charge from the CMOS sensor. Therefore, a temporal lag occurs in the readout timing of pixels.

Accordingly, to uniform the exposure times for all pixels as the case of the CCD sensor, it is necessary to uniform the exposure start timing by resetting all pixels of the CMOS sensor and the exposure termination time by closing the mechanical shutter 105. Te, T1, and T2 are the same as those in the case of the CCD sensor shown in FIG. 2.

Embodiment 2

Figure 5:
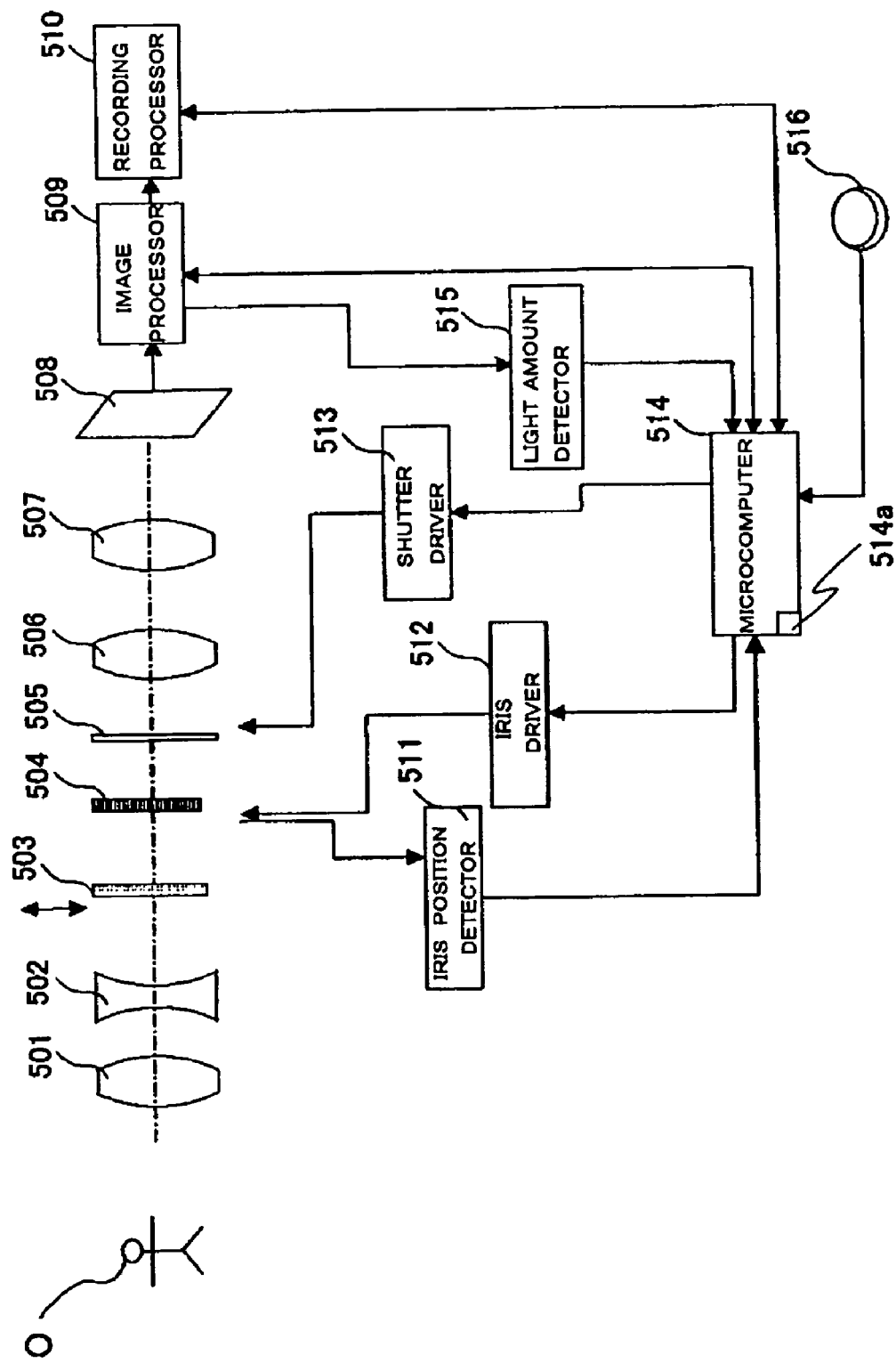
FIG. 5 is a block diagram showing the configuration of the image-pickup apparatus that is Embodiment 2 of the present invention.

FIG. 5 shows a video camera that is Embodiment 2 of the present invention. The video camera is a lens-integrated camera.

Light from an object O passes through an image-taking optical system and reaches an image-pickup element 508 such as an interlace CCD sensor and a CMOS sensor. The image-taking optical system is constituted by, in order from the object side, a fixed lens unit 501, a zoom lens unit (variator) 502 for varying the magnification, an aperture stop (hereinafter, referred to as an iris) 504, a mechanical shutter 505, a fixed third lens unit 506, and a focus lens unit (compensator) 507 for focusing.

An ND filter 503 can be inserted into and removed from an area between the zoom lens unit 502 and the iris 504, which enables two-step light amount adjustment. The iris 504 is a mechanical aperture stop, adjusting the light amount stepwise or continuously. The mechanical shutter 505 is provided separately from the iris 504; its shutter operation from the full-open state to the full-closed state enables taking still images.

The image-pickup element 508 electrically converts an object image formed on its light-receiving surface into an electronic signal.

The output signal from the image-pickup element 508 is subjected to processes such as AGC (auto gain control) and color adjustment by an image processor 509, and then sent to a recording processor 510. The recording processor 510 records the processed signal as an image signal on a recording medium such as a semiconductor memory, an optical disk, or a magnetic tape, not shown. The image (moving image) taken at this time is an image having 60 fields per one second in NTSC format, or an image having 50 fields per one second in PAL format.

A light amount detector 515 measures whether the current image signal has an adequate light amount or not on the basis of the image signal output from the image processor 509, and then sends a light amount evaluation value signal (data) showing an evaluation value of the amount of light incident on the image-pickup element 508 to a microcomputer 514.

The microcomputer 514 controls the iris 504 based on data from the light amount detector 515. The iris 504 is equipped with an iris position detector 511 which detects the position of aperture blades corresponding to the opening state (aperture diameter). The current iris position, that is, aperture value (F-number) thereby can be electrically detected.

In addition, an iris driver 512 is provided which changes the iris position. The microcomputer 514 calculates the driving amount of the aperture blades based on the light amount evaluation value from the light amount detector 515 to obtain an adequate aperture value. The microcomputer 514 performs positional servo control of the aperture blades through the iris driver 512 to control the aperture diameter.

The repetition of a series of operations from the light amount detection and evaluation to the drive of the iris 504 enables adequate light amount control.

The mechanical shutter 505 has two stable states that are the full-open state and the full-closed state, being fixed to the full-open state through a shutter driver 513 when taking moving images.

The camera 118 is equipped with a release switch 516 that is operated when taking a still image. A half-press operation (S1 ON) of the release switch 516 starts a still-image-pickup preparing operation. The still-image-pickup preparing operation includes a focusing operation to focus the image-taking optical system on the object and an iris driving operation to obtain an adequate exposure.

In normal still image-pickup, the exposure is automatically determined according to the AGC, the aperture value, and the shutter speed. In addition, the user can select image-pickup modes such as a shutter-speed priority mode and an aperture-priority mode.

A full-press operation (S2 ON) of the release switch 516 causes the camera to take a still image by mechanical shutter control and electronic shutter control. The mechanical shutter control and the electronic shutter control in this embodiment are similar to those described in Embodiment 1.

Figure 6:
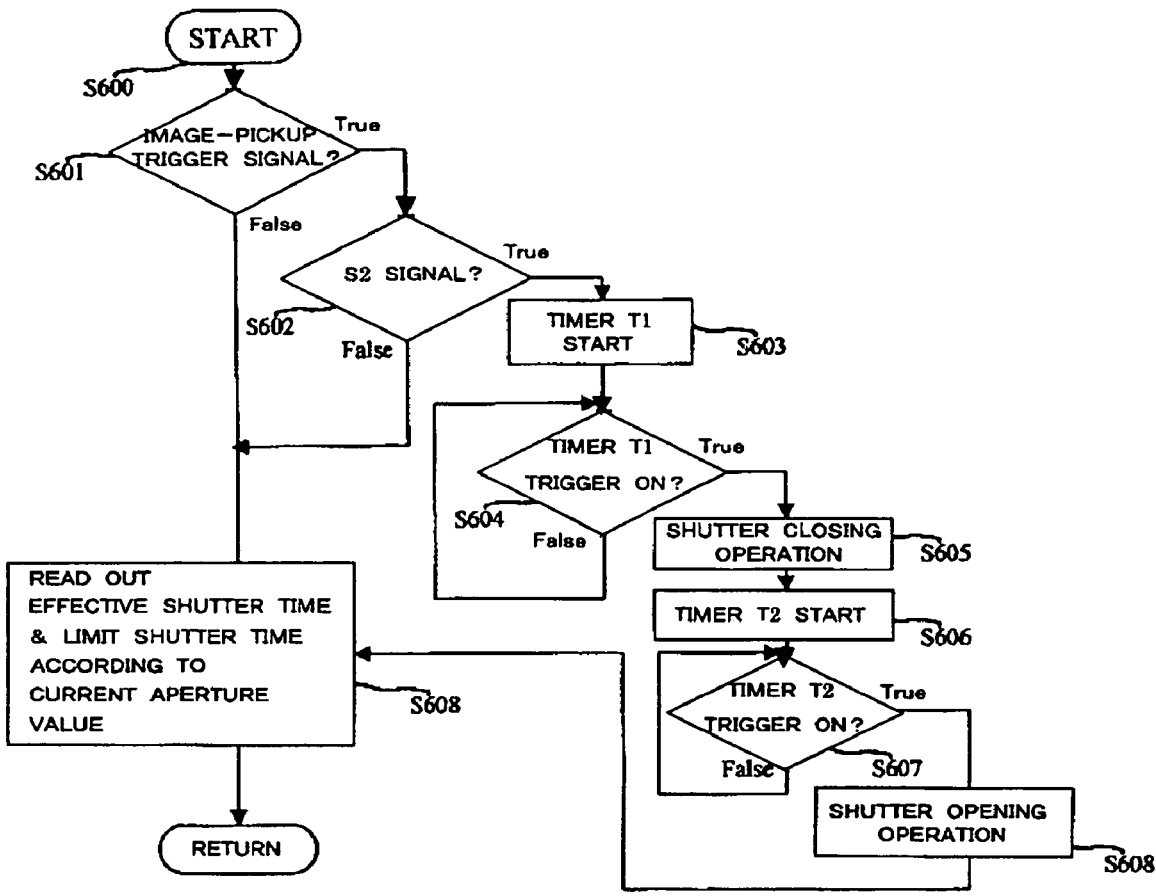
FIG. 6 is a flow chart showing the operation of the microcomputer in Embodiment 2.

Next, the description will be made of the still-image-pickup process performed by the microcomputer 514 in this embodiment with reference to the flow chart shown in FIG. 6.

After starting from Step (hereinafter, abbreviated as "S") 600, the microcomputer 514 judges whether or not an image-pickup trigger signal was input (S601). When the image-pickup trigger signal was input, the process proceeds to S602. When the image-pickup trigger signal was not input, the microcomputer 514, at S608, reads out the effective shutter time (or the effective shutter speed) and the limit shutter time (or the limit shutter speed) for the current aperture value (F-number) from a memory 514a in the microcomputer 514.

The microcomputer 514 determines the setting limit value of the shutter speed without exceeding the limit shutter speed and the timing of the electronic shutter control of the image-pickup element 508.

The microcomputer 514, at S602, judges whether or not the S2 signal was input. When not input, the process proceeds to S 608. On the other hand, when the S2 signal was input, the microcomputer 514 starts a timer for counting the time T1 (the same time as the period T1) at S603.

When the time T1 elapsed at S604, the microcomputer 514 starts the closing operation of the mechanical shutter 505 via the shutter driver 513 at S605. The reason why the microcomputer 514 waits for the elapse of the time T1 at S604 is the same as that described in Embodiment 1.

Next, the microcomputer 514 starts a timer for counting the time T2 (the same time as the period T2) at S606. When the time T2 elapsed at S607, the microcomputer 514 returns the mechanical shutter 505 via the shutter driver 513 from the full-closed position to the full-opened position at S608. This is the end of the process of still-image-pickup.

As described above, according to each embodiment, since the electronic shutter is controlled without using a detector to detect the state of the mechanical shutter, it is possible to take still images at an arbitrary electronic shutter time or electronic shutter speed while satisfying requirements such as increase of speed of the mechanical shutter, resolution of space insufficiency in the apparatus, and cost reduction. In addition, using the lens apparatus which includes the mechanical shutter together with the image-pickup apparatus for taking moving images makes it possible to perform progressive still-image-pickup even though the image-pickup apparatus is for taking moving images.

Although the above embodiments show an example of a way to calculate the effective shutter time and the effective shutter speed, other ways to calculate them can be used. Furthermore, the process can be performed not only by direct use of the effective shutter time and the effective shutter speed, but also by use of other format data converted from them.

Furthermore, the present invention is not limited to these preferred embodiments and various variations and modifications may be made without departing from the scope of the present invention.

This application claims a foreign priority benefit based on Japanese Patent Application No. 2005-165429, filed on Jun. 6, 2005, which is hereby incorporated by reference herein in its entirety as if fully set forth herein.

What is claimed is:

1. An image-pickup system comprising:
   an image-pickup apparatus including an image-pickup element; and
   a lens apparatus which is detachably attached to the image-pickup apparatus and is possibly communicated to the image-pickup apparatus,
   wherein the lens apparatus includes:
      an aperture stop;
      a mechanical shutter;
      a detector which detects an opening state of the aperture stop; and
      a memory which, according to the opening state of the aperture stop, stores first information relating to time from the start of image-pickup to the completion of closing operation of the mechanical shutter, and second information relating to time from the start of shielding of light that passed through the aperture stop to the completion of the shielding of light,
   wherein the image-pickup apparatus includes a controller which performs an electronic shutter control of the image-pickup element and a control of the mechanical shutter, and
   wherein the controller receives the first and the second information, determined according to the opening state of the aperture stop, that is sent from the lens apparatus, resets charge accumulated in the image-pickup element in the electronic shutter control based on the received first information, and controls the mechanical shutter by a shutter speed not faster than a limit shutter speed corresponding to the received second information.

2. The image-pickup system according to claim 1, wherein the first information is one of a value and its inverse, the value being obtained by dividing an exposure amount of the image-pickup element from the start of the image-pickup to the completion of the closing operation of the mechanical shutter according to the opening state of the aperture stop by an exposure amount of the image-pickup element in unit time according to the opening state of the aperture stop in a state in which the mechanical shutter is fully opened.

3. An image-pickup apparatus comprising:
   an image-pickup element;
   an aperture stop;
   a detector which detects an opening state of the aperture stop;
   a memory which, according to the opening state of the aperture stop, stores first information relating to time from the start of image-pickup to the completion of closing operation of the mechanical shutter, and second information relating to time from the start of shielding of light that passed through the aperture stop to the completion of the shielding of light; and
   a controller which performs an electronic shutter control of the image-pickup element and a control of the mechanical shutter,
   wherein the controller resets charge accumulated in the image-pickup element in the electronic shutter control based on the received first information determined according to the opening state of the aperture, stop, and controls the mechanical shutter by a shutter speed not faster than a limit shutter speed corresponding to the received second information.

4. The image-pickup apparatus according to claim 3, wherein the first information is one of a value and its inverse, the value being obtained by dividing an exposure amount of the image-pickup element from the start of the image-pickup to the completion of the closing operation of the mechanical shutter according to the opening state of the aperture stop by an exposure amount of the image-pickup element in unit time according to the opening state of the aperture stop in a state in which the mechanical shutter is fully opened.

* * * * *